United States Patent [19]

Nelson

[11] 4,328,932

[45] May 11, 1982

[54] REEL WEIGHT ASSEMBLY

[75] Inventor: Norman E. Nelson, Roseville, Minn.

[73] Assignee: Minnesota Mining and Manufacturing Company, St. Paul, Minn.

[21] Appl. No.: 203,437

[22] Filed: Nov. 3, 1980

[51] Int. Cl.³ ............................................. B65H 75/18
[52] U.S. Cl. ................................................. 242/71.8
[58] Field of Search ............... 242/71.8, 55, 115, 116, 242/77, 77.3, 118.4, 118.8; 74/573 R; 73/66

[56] References Cited

U.S. PATENT DOCUMENTS

| | | | |
|---|---|---|---|
| 430,270 | 6/1890 | Cook | 74/573 |
| 2,955,876 | 10/1960 | Kinsey | 74/573 X |
| 3,236,473 | 2/1966 | Hulfgren | 242/71.8 |
| 3,410,500 | 11/1968 | Elliott | 242/71.8 |
| 4,293,102 | 10/1981 | Niles | 242/71.8 |

*Primary Examiner*—Edward J. McCarthy
*Attorney, Agent, or Firm*—Cruzan Alexander; Donald M. Sell; William L. Huebsch

[57] ABSTRACT

A weight assembly adapted for use with a polymeric reel to approximately match the moment of inertia of the polymeric reel to that of a similar metal reel. The weight assembly includes attachment assemblies adapted to enter apertures in a side wall of the reel, which attachment assemblies include pendulums automatically moved by gravity or centrifugal forces to releasably attach the weight assembly to the side wall of the reel.

2 Claims, 4 Drawing Figures

4,328,932

REEL WEIGHT ASSEMBLY

TECHNICAL FIELD

The present invention is related to weights adapted to be releasably inserted in sockets formed in plastic videotape reels to approximately match the moment of inertia of the plastic reel to that of a metal reel.

BACKGROUND ART

The one-inch video broadcast machines presently in use in the television industry are designed to use metal reels for supplying and taking up magnetic tape for the machine. Light weight, usually smaller, and relatively inexpensive polymeric reels have recently come into use for storing and shipping one-inch videotape. While polymeric reels can be used on such video broadcast machines, they do not have the same moment of inertia as the metal reels for which the machine reel drives were designed, and thus can cause operational problems (particularly when such reels have little tape wound about them) such as instability of servo-systems in the reel drives when the reels are being slowed down, which causes improper movement of the tape across the tape head. Also, when such a polymeric reel is used as a takeup reel in combination with a metal tape supply reel and the machine is stopped, the plastic reel will stop more quickly than the supply reel, thereby causing a loop of tape to form between the reels that can damage the tape when the machine is re-started; and when such a polymeric reel is used as a supply reel in combination with a metal takeup reel, the plastic reel will again stop more quickly than the metal reel when the machine is stopped, causing the tape between the reels to be stretched and potentially damaged. Thus it has been found desirable to match the moment of inertia of polymeric reels with that of metal reels when polymeric reels are used on video broadcast machines.

One prior art method for providing a moment of inertia for a polymeric reel that approximates the moment of inertia for metal reels has been to insert weights into sockets formed around a hub portion of the polymeric reel and opening through a side surface of the reel. Known weights used for this purpose have comprised a heavy metal core encased in a resilient elastic material (e.g., rubber) and adapted to frictionally engage the walls defining the sockets in the reel. To use such weights, an operator presses each of three weights individually into one of three sockets around the hub portion of the reel, and after use must similarly pull each of the weights from within the sockets via a projecting handle portion on each weight.

While such weights can generally match the moment of inertia of the polymeric reel to that of the metal reels, their use is more inconvenient and time consuming than may be desired.

U.S. patent application Ser. No. 159,290, now U.S. Pat. No. 4,293,102, describes a weight assembly which is acknowledged as prior art to the weight assembly described in this application, which prior art weight assembly is adapted for use to generally match the moment of inertia of a polymeric reel with that of a metal reel, and is a one-piece unit that may be more quickly and conveniently inserted in and removed from the polymeric reel than the individual weights described above.

The weight assembly described in application Ser. No. 159,290 is for use on polymeric reels of the type comprising a hub portion having side surfaces, a through central opening, and a plurality of sockets opening through one side surface of the reel and spaced around the through opening. The weight assembly comprises a support plate in the form of an annular ring having a central opening larger than the through opening of the reel to afford engagement of the reel by the video broadcast machine, and a plurality of weights spaced around and projecting axially from the ring in the same direction, which weights were shaped and spaced along the ring so as to enter the sockets in the reel when the weight assembly is brought coaxially adjacent the side surface of the reel. Means are also provided for releasably attaching the weight assembly to the reel with the weights in the sockets and the ring portion coaxially adjacent the side surface of the reel to prevent the weight assembly from flying off the reel during operation of the video broadcast machine.

The means for attaching, however, comprises spring clips projecting axially of the ring from the same side of the ring from which the weights project, which spring clips were adapted to releasably engage walls defining orifices in the reel. With this arrangement, the weight assembly can be pressed into position with the weights in the sockets and the spring clips engaging the reel, and can then be easily released from the reel by impacting the side of the reel against an operator's hand with the ring portion adjacent his hand so that the spring clips release from the reel and the weight assembly can be separated therefrom. While such spring slips firmly engage the reel, however, they do not positively lock the weight assembly to the reel, and the specter remains that under some circumstances the weight assembly could separate from the reel during use of the reel on a video machine, which could cause damage to the machine or its operator.

DESCRIPTION OF THE INVENTION

The present invention provides a weight assembly adapted for use to generally match the moment of inertia of a polymeric reel with that of a metal reel, which weight assembly may be quickly and conveniently inserted in or removed from the polymeric reel, and positively and automatically locks in the reel to restrict separation of the weight assembly from the reel during use on a video machine.

According to the present invention, there is provided a weight assembly which like the one-piece weight assembly described above, comprises a support plate and means for releasably attaching the plate along a side surface of the reel to prevent the weight assembly from flying off the reel during operation of the video broadcast machine. Unlike the previously described weight assembly, however, the means for releasably attaching in the weight assembly according to the present invention comprises a plurality of attachment assemblies each including (1) a post having a first end fixed to and projecting from one surface of the plate and (2) a pendulum having a free end portion adjacent the plate and being pivotably mounted adjacent the distal end of the post for movement in a radial direction with respect to an axis of the plate (and an axis of a reel on which the weight assembly is co-axially mounted) between a release position generally aligned with the post, and a lock position projecting from the post.

Portions of the posts and the pendulums when in their release position will freely enter close-fitting apertures in a side wall of a reel adapted to receive the weight assembly, and the portion of the side wall around the apertures will cam the pendulums to their release positions if necessary as the weight assembly is engaged with the reel. After the weight assembly is in place, however, movement of one or more of the pendulums to their engage positions either under the influence of gravity when the reel is stationary and its axis is not vertical, or centrifugal force when the reel is being rotated, will cause the end of the pendulum adjacent the plate to engage the inner surface of the wall of a reel with which the weight assembly is engaged to prevent removal of the weight assembly from the reel. When it is desired to remove the weight assembly from the reel, however, this can be easily done by positioning the weight assembly with the posts projecting vertically upward, whereupon gravity will cause all of the pendulums to move to the release position and the weight assembly and reel can be separated.

BRIEF DESCRIPTION OF DRAWING

The present invention will be further described with reference to the accompanying drawing wherein like numbers refer to like parts in the several views and wherein.

DETAILED DESCRIPTION

Figures 1, 2, 3, 4:
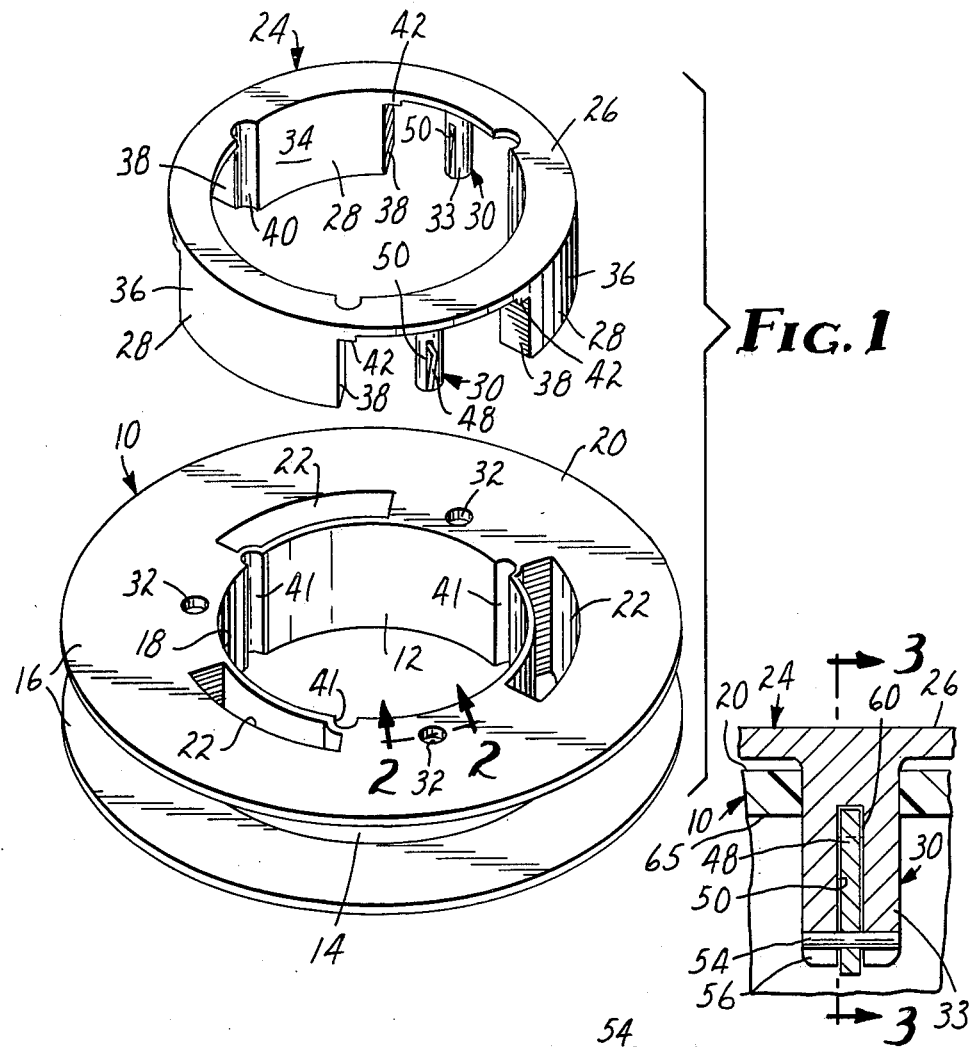
FIG. 1 is an exploded perspective view of a reel weight assembly according to the present invention and of a polymeric reel to which the weight assembly may be attached.
FIG. 2 is an enlarged fragmentary sectional view taken approximately along line 2—2 of FIG. 1 with the reel weight assembly engaged with the reel.
FIG. 3 is a fragmentary sectional view taken along line 3—3 of FIG. 2 showing a pendulum in an attachment assembly for the weight assembly in a lock position.
FIG. 4 is a view similar to FIG. 3 but showing the reel and weight assembly rotated 180 degrees and the pendulum in a release position.

Referring now to the drawing, there is illustrated a combination including a polymeric reel 10 having a hub portion 12 including walls defining a cylindrical outer surface 14 about which videotape may be wound between spaced reel flanges 16, a through central opening 18 between opposite side surfaces 20 of the reel 10, and three sockets 22 opening through each side surface of the reel 20 and spaced around the through opening 18. Also included is a weight assembly 24 according to the present invention adapted to releasably engage the reel 10 and provide a moment of inertia for the polymeric reel 10 that approximates the moment of inertia of a similar aluminum reel.

The weight assembly 24 comprises a support plate in the form of an annular ring portion or ring 26 having an opening slightly larger than the through central opening 18 of the reel 10 to facilitate engagement of the reel by a video broadcast machine; and a plurality of weight portions or weights 28 equally spaced around and projecting axially from one side of the ring 26, which weights 28 are spaced along the ring 26 and are shaped to enter the sockets 22 in the hub portion 12 of the reel 10 when the weight assembly 24 is brought coaxially adjacent either side surface 20 of the reel 10. Novel means for releasably attaching the weight assembly 24 to the reel 10 with the weights 28 in the sockets 22 and the ring 26 positioned coaxially adjacent one side surface 20 of the reel 10 are provided by three attachment assemblies 30 projecting axially of the ring 26 from the same side of the ring 26 from which the weights 28 project. The attachment assemblies 30 are spaced about halfway between the weights 28 and the walls of the reel 10 have apertures 32, which aperture-defining walls are adapted to be releasably engaged by the attachment assemblies 30 (FIG. 3) to hold the weight assembly 24 on the reel 10.

Preferably, the annular ring 26, the weights 28 and projecting posts 33 included in the attachment assemblies 30 are integrally cast of metal (e.g., steel) with each weight 28 conforming closely in shape to the inner surface of the walls defining the sockets 22 in the reel 10 by having cylindrically concave inner surfaces 34, cylindrically convex outer surfaces 36, axially-aligned planar end surfaces 38, and a radially-extending groove 40 at a corresponding end of each of the weights 28. The groove 40 in each weight 28 is adapted to receive an arcuate wall having an outer surface defining a portion of one of the sockets 22, and an inner surface defining one of three axially-extending channels 41 in the reel 10 opening into its central opening 18 and adapted to receive a portion of reel drive means on a video machine (not shown). Additionally, the weights include tabs 42 projecting along the adjacent surface of the annular ring 26, which tabs 42 are adapted to engage the side surface 20 of the reel 10 adjacent the ring 26 and space the ring 26 therefrom by a small distance (e.g., 0.33 cm or 0.13 inch) to facilitate engagement of the reel 10 by the drive means on certain types of video broadcast machines.

The novel attachment assemblies 30 for releasably attaching the weight assembly 24 to the reel 10 comprise the posts 33, each of which has a first end fixed to the ring 26 with the post 33 projecting from the same side of the ring 26 as the weights 28, and an enlongate plate-like pendulum 48 adapted to be received in a longitudinally extending slot 50 in the post 33. Each pendulum 48 has a free end portion 52 adjacent the ring 26 and is pivotably mounted on one of the posts 33 via a pin 54 frictionally received in a transverse groove 56 in the distal end of the post 33 for movement in a radial direction with respect to the ring 26 (and thus with respect to the reel 10 on which the weight assembly 24 is mounted). Such pivotal movement of the pendulum 48 allows it to freely move between (1) a release position (FIG. 4) with the pendulum 48 almost entirely within the slot 50 and generally aligned with the post 33, which release position is defined by near engagement of an edge surface 58 partially defining a notch in the free end portion 52 of the pendulum 48 with a lip 60 on the post 33 at the base of the slot 50 and to which release position the pendulum 48 will be biased by gravity when the post 33 projects vertically upward, and (2) a lock position (FIG. 3) with the free end portion 52 of the pendulum 48 projecting from the post 33 radially outwardly of the ring 26, which lock position is defined by engagement with the lip 60 of an edge surface 61 also partially defining the notch in the end portion of the pendulum.

To apply the weight assembly 24 according to the present invention to the reel 10, a user simply inserts the three weights 28 on the assembly 24 into the sockets 22 opening through one side surface 20 of the reel 10 and presses the weight assembly 24 against the reel 10 so that the attachment assemblies 30 enter the apertures 32 in the wall of the reel 10. The posts 33 and pendulums 48 are adapted to freely enter the apertures 32 when the pendulums 48 are in their release position, and the portions of the reel wall around the apertures 32 will cam the pendulums 48 to their release positions as the weight assembly 24 is pressed into position on the reel 10. After the pendulums 48 have moved through the apertures 32 past an inner surface 65 of the reel wall, however, with any substantial tipping of the axis of the reel 10 from the vertical, gravity will cause one or more of the pendulums 48 to move toward their lock positions (FIG. 3) so that end surfaces 62 on the pendulums 48 will be adjacent and engage the inner surface 65 of the reel wall to lock the weight assembly 24 on the reel 10. The operator may then mount (or may have already mounted) the reel 10 on a video broadcast machine via the attachment means on that machine, whereupon after the machine is started to rotate the reel 10, the moment of inertia of the reel 10 and weight assembly 24 will be generally matched to the moment of inertia of metal reels which may also be used on the machine and for which the machine was designed so that tape will be properly moved through the machine between the reels. Also, upon such rotation of the reel 10, centrifugal force will cause all of the pendulums 48 to swing to their engage position to positively lock the weight assembly 24 on the reel 10. Subsequently, when the operator removes the reel 10 from the machine, he may easily remove the weight assembly 24 from the reel 10 by positioning the weight assembly 24 so that the posts 33 project vertically upwardly (FIG. 4), whereupon gravity will move the pendulums 48 to their release position and the attachment assemblies 30 can move through the walls defining the apertures 32 to afford separation of the reel 10 and weight assembly 24.

The weight assembly according to the present invention has now been explained with reference to a preferred embodiment, however, it will be appreciated by those skilled in the art that many changes could be made in the design of the weight assembly without departing from the spirit of the present invention. For example, spring clips could be added to the posts 33 that could frictionally engage the wall defining the apertures 32 when the posts 33 are inserted therein to ensure proper positioning of the posts 33 for subsequent engagement of the pendulums 48 with the wall of the reel 10 via gravity or centrifugal force. Also, the weights 28 might be incorporated with the plate or ring 26 and lie along one of the side surfaces 20 of the reel 10 rather than projected into the sockets 22 in the reel 10. Thus the scope of the present invention should not be limited to the structure described in the specification, but only by structures described by the language of the dependent claims and their equivalents.

I claim:

1. In a weight assembly adapted for use with a polymeric reel comprising a hub portion having an axis and opposite side surfaces, said weight assembly comprising a support plate having a side surface and an axis normal to said side surface, and means for releasably attaching said plate coaxially to a said reel adjacent one of the side surfaces of said reel, the improvement wherein said means for releasably attaching comprises a plurality of attachment assemblies disposed around the axis of said plate, each of said attachment assemblies comprising a post having a first end fixed to said plate with said post projecting from said side surface of the plate and a pendulum having a first end fixed to said plate with said post projecting from said side surface of the plate and a pendulum having a free end portion adjacent said plate and being pivotably mounted on the post adjacent the distal end of said post for movement in a radial direction with respect to the axis of said plate between a release position generally aligned with the post, and a lock position with the free end portion projecting from the post.

2. A weight assembly according to claim 1 further adapted for use with a reel having a through central opening between its side surfaces, and a plurality of sockets opening through the side surfaces of said reel and spaced around said through opening, wherein said support plate has a central opening about its axis, a plurality of weights spaced around and projecting from said side surface of said support plate, said weights being shaped and spaced along said support plate around said axis so as to enter the sockets in a said reel when said weight assembly is brought adjacent one of the side surfaces of the reel; and said plate, weights and posts are integrally cast of metal.

* * * * *

UNITED STATES PATENT AND TRADEMARK OFFICE
CERTIFICATE OF CORRECTION

PATENT NO. : 4,328,932

DATED : May 11, 1982

INVENTOR(S) : Norman E. Nelson

It is certified that error appears in the above—identified patent and that said Letters Patent is hereby corrected as shown below:

Col. 6, lines 23-25, "having a first end fixed to said plate with said post projecting from said side surface of the plate and a pendulum" should be deleted.

Signed and Sealed this

Twentieth Day of March 1984

[SEAL]

Attest:

GERALD J. MOSSINGHOFF

Attesting Officer

Commissioner of Patents and Trademarks